US010755287B2

(12) United States Patent
Kazan et al.

(10) Patent No.: US 10,755,287 B2
(45) Date of Patent: Aug. 25, 2020

(54) SELECTING BETWEEN CLIENT-SIDE AND SERVER-SIDE MARKET DETECTION

(75) Inventors: Wissam S. Kazan, Redmond, WA (US); Francislav P. Penov, Kirkland, WA (US); Gaurav Arora, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 1640 days.

(21) Appl. No.: 12/277,744

(22) Filed: Nov. 25, 2008

(65) Prior Publication Data
US 2010/0131351 A1    May 27, 2010

(51) Int. Cl.
*G06Q 30/02*        (2012.01)
*G06F 8/70*         (2018.01)

(52) U.S. Cl.
CPC .............. *G06Q 30/02* (2013.01); *G06F 8/70* (2013.01); *G06Q 30/0205* (2013.01); *G06Q 30/0243* (2013.01)

(58) Field of Classification Search
USPC ................................. 715/703, 744, 745, 747
See application file for complete search history.

(56) References Cited

U.S. PATENT DOCUMENTS

| | | | | |
|---|---|---|---|---|
| 5,416,903 A * | 5/1995 | Malcolm | ........................ | 715/703 |
| 5,475,819 A * | 12/1995 | Miller | ..................... | G06F 9/547 |
| | | | | 700/178 |
| 6,252,589 B1 * | 6/2001 | Rettig et al. | .................. | 715/703 |
| 6,418,169 B1 * | 7/2002 | Datari | ..................... | H04L 29/06 |
| | | | | 375/240.28 |
| 6,717,588 B1 * | 4/2004 | Miller et al. | ................... | 715/700 |
| 6,796,496 B2 * | 9/2004 | Andersen et al. | ............ | 235/380 |
| 7,039,688 B2 * | 5/2006 | Matsuda | ........... | H04L 29/12009 |
| | | | | 709/203 |
| 7,136,909 B2 * | 11/2006 | Balasuriya | ..................... | 709/220 |
| 7,321,918 B2 * | 1/2008 | Burd et al. | ..................... | 709/203 |
| 7,340,389 B2 * | 3/2008 | Vargas | .............................. | 704/8 |
| 7,356,544 B2 | 4/2008 | Giunta | | |
| 7,363,586 B1 * | 4/2008 | Briggs et al. | .................. | 715/736 |
| 7,464,334 B2 * | 12/2008 | Miller et al. | ................... | 715/700 |
| 7,669,124 B2 * | 2/2010 | Ye et al. | ........................ | 715/703 |
| 7,953,662 B2 * | 5/2011 | Bryant et al. | ................... | 705/43 |
| 7,978,618 B2 * | 7/2011 | Richardson et al. | ......... | 370/252 |
| 7,996,351 B1 * | 8/2011 | Leffert | .................. | G06Q 30/02 |
| | | | | 706/47 |

(Continued)

OTHER PUBLICATIONS

Rodriguez-Martínez et al (Registration and Discovery of Services in the NetTraveler Integration System for Mobile Devices) (Year: 2004).*

(Continued)

*Primary Examiner* — Mamon Obeid

(57) ABSTRACT

In accordance with one or more aspects of selecting between client-side and server-side market detection, a determination is made at a device as to which of a client-side detected market and a server-side detected market is to have priority for a service. An application of the device is configured in accordance with a client-side market configuration setting if the client-side detected market has priority, and is configured in accordance with a server-side market configuration setting if the server-side detected market has priority.

20 Claims, 5 Drawing Sheets

(56) References Cited

U.S. PATENT DOCUMENTS

| | | | |
|---|---|---|---|
| 8,069,433 B2* | 11/2011 | Parsell et al. | 717/103 |
| 8,607,059 B2* | 12/2013 | Mason | G06F 8/61 380/243 |
| 2001/0051876 A1* | 12/2001 | Seigel | G06Q 30/02 705/26.1 |
| 2002/0052910 A1* | 5/2002 | Bennett et al. | 709/104 |
| 2002/0116172 A1* | 8/2002 | Vargas | H04M 1/72519 704/8 |
| 2002/0169865 A1* | 11/2002 | Tarnoff | G06F 21/6218 709/223 |
| 2003/0037139 A1* | 2/2003 | Shteyn | G06Q 30/02 709/225 |
| 2003/0067872 A1* | 4/2003 | Harrell et al. | 370/229 |
| 2004/0107250 A1* | 6/2004 | Marciano | 709/204 |
| 2004/0192306 A1* | 9/2004 | Elkarat | H04W 8/06 455/435.2 |
| 2005/0138193 A1* | 6/2005 | Encarnacion et al. | 709/230 |
| 2005/0262399 A1* | 11/2005 | Brown | G06F 11/2257 714/38.1 |
| 2006/0022048 A1* | 2/2006 | Johnson | H04W 4/029 235/462.1 |
| 2006/0234679 A1* | 10/2006 | Matsumoto | H04M 3/382 455/411 |
| 2006/0242621 A1* | 10/2006 | Ye et al. | 717/105 |
| 2007/0270161 A1* | 11/2007 | Hampel | G06Q 30/02 455/456.1 |
| 2008/0004953 A1* | 1/2008 | Ma et al. | 705/14 |
| 2008/0059390 A1* | 3/2008 | Cox | G06Q 30/02 706/12 |
| 2008/0103952 A1 | 5/2008 | Flake et al. | |
| 2008/0155538 A1* | 6/2008 | Pappas | G06Q 30/02 718/100 |
| 2008/0182723 A1* | 7/2008 | Aaron et al. | 482/8 |
| 2008/0215436 A1* | 9/2008 | Roberts | G06Q 30/0207 705/14.1 |
| 2008/0281943 A1* | 11/2008 | Shapiro | 709/218 |
| 2009/0143048 A1* | 6/2009 | Ayanamcottil | H04W 12/1206 455/410 |
| 2009/0187463 A1* | 7/2009 | DaCosta | G06Q 30/02 705/14.58 |
| 2009/0222329 A1* | 9/2009 | Ramer | G06Q 30/02 705/14.52 |
| 2010/0024040 A1* | 1/2010 | Nimura | G06F 21/88 726/26 |
| 2010/0106597 A1* | 4/2010 | Jayakody | G06Q 30/02 705/14.53 |
| 2010/0131351 A1* | 5/2010 | Kazan | G06Q 30/02 705/14.42 |
| 2011/0055927 A1* | 3/2011 | Hamilton, II | G06F 3/011 726/26 |
| 2011/0113377 A1* | 5/2011 | Lategan | G06F 9/451 715/835 |
| 2011/0179149 A1* | 7/2011 | Kazan et al. | 709/221 |
| 2011/0191187 A1* | 8/2011 | Charbit et al. | 705/14.64 |
| 2011/0202269 A1* | 8/2011 | Reventlow | G06F 21/316 701/533 |
| 2011/0258049 A1* | 10/2011 | Ramer | G06Q 30/02 705/14.66 |
| 2012/0173358 A1* | 7/2012 | Soroca | G06Q 30/02 705/26.3 |
| 2012/0179563 A1* | 7/2012 | Soroca | G06Q 30/02 705/26.3 |
| 2012/0179564 A1* | 7/2012 | Soroca | G06Q 30/02 705/26.3 |
| 2013/0036458 A1* | 2/2013 | Liberman | H04L 9/3231 726/6 |
| 2013/0185749 A1* | 7/2013 | Bill | G06Q 30/02 725/32 |
| 2013/0254787 A1* | 9/2013 | Cox | G06Q 30/02 725/13 |
| 2017/0083590 A1* | 3/2017 | Jagarlamudi | G06F 16/335 |
| 2017/0201850 A1* | 7/2017 | Raleigh | H04M 15/00 |

OTHER PUBLICATIONS

"Frequently Asked Questions Windows Server 2003, Windows XP & Windows 2000 MUI", Retrieved at <<http://www.microsoft.com/globaldev/DrIntl/faqs/MUIFaq.mspx#MUIques3>>, Sep. 24, 2008, pp. 1-5.

"Managing Globalized Web Sites with EPiServer CMS", Retrieved at <<http://www.episerver.com/downloads/Documents/White%20Papers%20CMS%205/Managing%20Globalized%20Web%20Sites%20with%20EPiServer%20CMS.pdf>>, pp. 1-7.

"Software Globalisation and Multilingual User Interface", Retrieved at <<ftp://ftp.software.ibm.com/software/ globalization/documents/multilingual_software_interface.pdf>>, pp. 2.

* cited by examiner

SELECTING BETWEEN CLIENT-SIDE AND SERVER-SIDE MARKET DETECTION

BACKGROUND

Computers have become increasingly commonplace throughout the world, and these computers have become increasingly interconnected via the Internet and other networks. Although this increased connectivity has advantages, it also comes with disadvantages. One problem that can arise is that computers can be used from many locations around the world to access other computers in other parts of the world. However, the configuration and settings for a computer in one part of the world may not be appropriate for another part of the world. Similarly, it may be desirable to have a server computer accessed by computers in one part of the world provide different services than when accessed by computers in another part of the world. These problems are burdensome on the part of the service suppliers, and can detract from the usability of computers throughout the world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a determination is made at a device as to which of a client-side detected market and a server-side detected market is to have priority for a service. An application of the device is configured in accordance with a client-side market configuration setting if the client-side detected market has priority, and is configured in accordance with a server-side market configuration setting if the server-side detected market has priority.

In accordance with one or more aspects, a computing device includes a processor and one or more computer readable media. The one or more computer readable media stores a market priority table and instructions. The market priority table maintains one or more records that identify, for each of multiple markets and each of the one or more services, configuration settings for an application. The instructions, when executed by the processor, cause the processor to determine the configuration settings for the application based on the market priority table and a determination of whether a client-side detected market has priority or a server-side detected market has priority.

BRIEF DESCRIPTION OF THE DRAWINGS

The same numbers are used throughout the drawings to reference like features.

DETAILED DESCRIPTION

Selecting between client-side and server-side market detection is discussed herein. During operation, an application running on a computing device is configured to present a user interface and/or make particular remote services available via the user interface. A market priority table is maintained that allows the application to automatically determine whether a server-side detected market or a client-side detected market has priority. Based on this determination, the application is automatically configured using server-side or client-side market configuration settings. This determination is made based on one or more of a market setting for the operating system of the computing device, a geographic location of the computing device, and where an online account of the user of the computing device was provisioned. This automatic configuration allows the computing device to present an appropriate user interface and/or make available appropriate remote services in a wide variety of scenarios.

Figure 1:
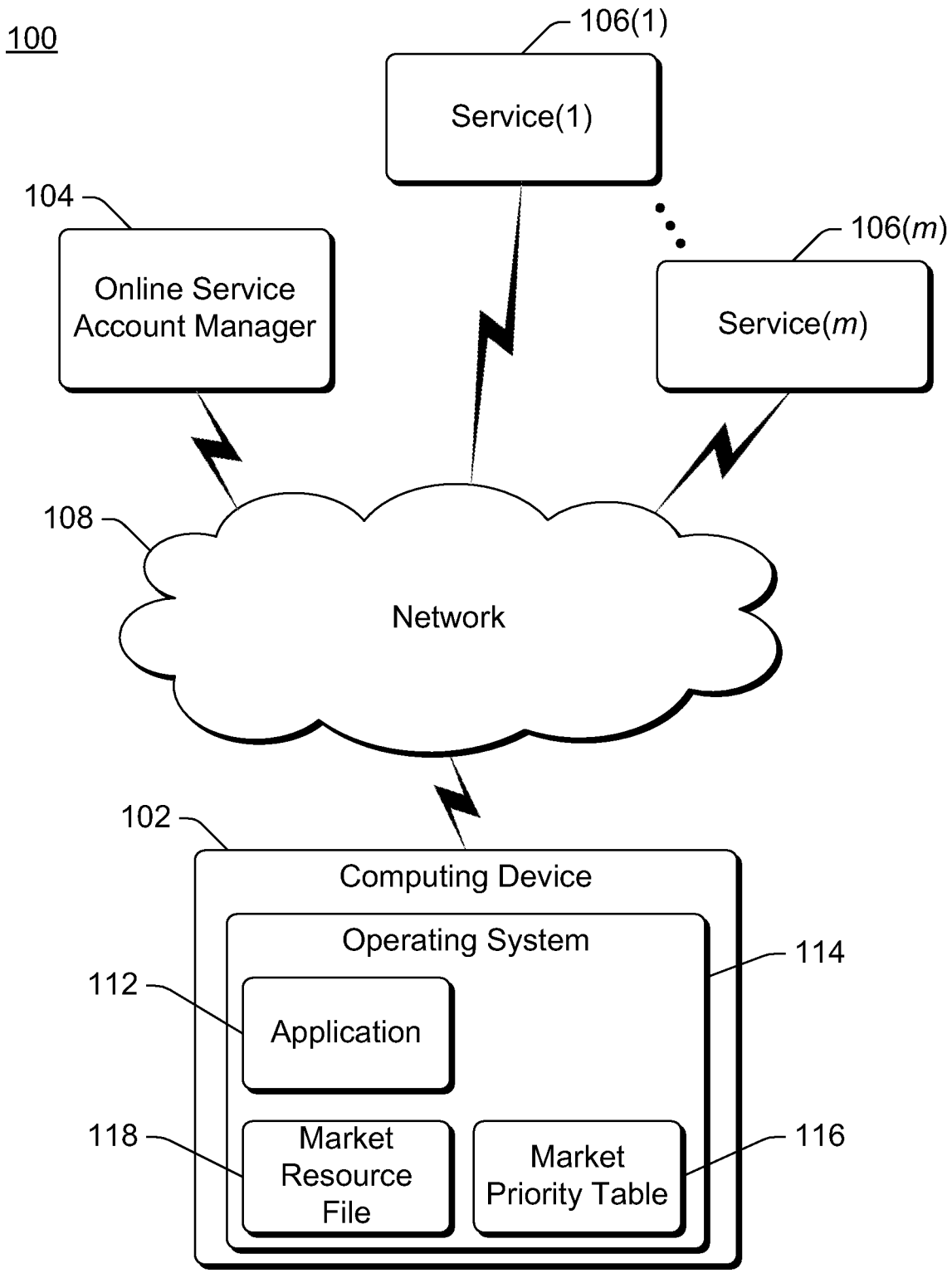
FIG. 1 illustrates an example system implementing the selecting between client-side and server-side market detection in accordance with one or more embodiments.

FIG. 1 illustrates an example system 100 implementing the selecting between client-side and server-side market detection in accordance with one or more embodiments. System 100 includes a computing device 102, an online service account manager 104, and one or more (m) additional remote services 106(1 . . . m). Device 102, manager 104, and services 106 can communicate with one another via a network 108. Network 108 can be a variety of different networks, including the Internet, a local area network (LAN), a public telephone network, a cellular or other wireless phone network, an intranet, other public and/or proprietary networks, combinations thereof, and so forth.

Computing device 102 can be a variety of different devices capable of running an application. For example, computing device 102 can be a desktop computer, a mobile station, an entertainment appliance, a set-top box communicatively coupled to a display device, a cellular or other wireless phone, a game console, an automotive computer, and so forth. Thus, computing device 102 can range from a full resource device with substantial memory and processor resources (e.g., personal computers, game consoles) to a low-resource device with limited memory and/or processing resources (e.g., traditional set-top boxes, hand-held game consoles).

Online service account manager 104, and each of services 106, is typically implemented by one or more servers. Similar to the discussion of computing device 102, each such server can be a variety of different devices, ranging from full resource devices with substantial memory and processor resources to a low-resource device with limited memory and/or processing resources. Each service 106 can be implemented on a different server, or alternatively multiple services 106 can be implemented on the same server. Additionally, each of services 106 can be implemented on the same or a different server as manager 104.

Online service account manager 104 manages an online service account for a user of computing device 102. Manager 104 allows the user to register for or otherwise create an online account, and further allows the user to login or sign in to his or her account. Manger 104 verifies that the user is authorized to access the particular account for which he or she attempts to login to. This authorization process can be performed in a variety of different manners, such as using a login identifier (id) and password assigned to the user, using a passphrase known to the user, using a digital certificate assigned to the user and/or computing device 102, and so forth.

Once a user is logged into his or her account through computing device 102, manager 104 allows computing device 102 to access one or more services 106(1 . . . *m*). Manager 104 can allow computing device 102 access to services 106 in a variety of different manners, such as communicating an identifier of computing device 102 to services 106, providing a passphrase or key to computing device 102 that can in turn be provided to services 106, and so forth.

Services 106 can be a variety of different services that are made available to computing device 102 and thus made available to a user of computing device 102. These services can provide any information and/or functionality that may be desired by a user of computing device 102, and different services 106 can provide different information and/or functionality. Examples of these services include reference information (e.g., maps, weather, news, etc.), entertainment (e.g., games, music, pictures, movies, etc.), advertising information, and so forth.

The particular services 106 made available to computing device 102 and/or the user interface presented by computing device 102 can vary based on the current market of computing device 102. The current market of computing device 102 refers to the market that computing device 102 is in at the time the user logs into his or her online service account and/or at the current time computing device 102 is running. This current market is automatically detected as a client-side detected market or a server-side detected market, as discussed in more detail below. These changes in the services 106 made available to computing device 102 and/or the user interface presented by computing device 102 are discussed in more detail below.

In one or more embodiments, the user of computing device 102 logs into his or her online service account via manager 104 prior to accessing services 106. In alternate embodiments, after the user has logged into his or her online account once, services 106 can be subsequently accessed without being logged into his or her online account. In such alternate embodiments, maintaining the ability to access services 106 can optionally be conditioned on the user re-logging in at regular or irregular intervals (e.g., daily, weekly, etc.).

Additionally, the user of computing device 102 can attempt to access services 106 without having ever logged into online service account manager 104 or otherwise not having an online service account. For example, some services 106 may allow anonymous access, in which case the user need not have an online account. If the user does not have an online service, then the selecting between client-side and server-side market detection still operates as discussed herein, although no account provisioning market would be available.

Computing device 102 includes an application 112, operating system 114, market priority table 116, and market resource file 118. Although application 112, market priority table 116, and market resource file 118 are illustrated as being part of operating system 114, alternatively one or more of application 112, table 116, and file 118 can be implemented separately from operating system 114. Operating system 114 can be a variety of different operating systems. In one or more embodiments, operating system 114 is an operating system in the Windows® operating system family of operating systems available from Microsoft Corporation of Redmond, Wash. Alternatively, operating system 114 can be other publicly available or proprietary operating systems.

Application 112 can be any of a variety of different applications that present a user interface (UI). The execution of application 112 can be managed by operating system 114, or alternatively by another application. In one or more embodiments, application 112 manages and presents a UI in the form of a toolbar for another application. This other application could be a Web browser application, or alternatively another application.

During execution, application 112 accesses services 106 and presents via a UI the functionality provided by services 106. The services 106 made available by application 112, as well as the UI presented by application 112, can vary based on a current market of computing device 102.

As part of varying of the UI presented by application 112 and determining the services 106 to be made available by application 112, a determination is automatically made by computing device 102 as to whether a client-side detected market has priority for a service 106 or a server-side detected market has priority for service 106. If a client-side detected market has priority, then client-side market configuration settings are used to configure application 112. On the other hand, if a server-side detected market has priority, then server-side market configuration settings are used to configure application 112. In one or more embodiments, this determination is made by application 112, although alternatively this determination can be made by operating system 114 and/or another component or module of computing device 102.

A client-side detected market refers to a current market of computing device 102 being determined based on local information available to computing device 102. This local information can be, for example, an operating system market setting of operating system 114 as discussed in more detail below and/or chosen manually by a user of computing device 102. An example of a client-side market detection technique is the Multilingual User Interface (MUI) technique used in the Windows® operating system family of operating systems available from Microsoft Corporation of Redmond, Wash. It is to be appreciated that the MUI technique is, however, an example and that alternatively other client-side market detection techniques can be used.

A server-side detected market refers to a current market of computing device 102 being determined based on information available to a remote server, such as a server implementing online service account manager 104 or a service 106. This information available to the remote server can be, for example, a geographic location of computing device 102 and/or a market where an online service account for a user of computing device 102 was provisioned as discussed in more detail below.

Client-side market configuration settings refer to configuration settings that apply for a client-side detected market. These client-side market configuration settings can be available from market priority table 116 or alternatively other sources. Server-side market configuration settings refer to configuration settings that apply for a server-side detected market. These server-side market configuration settings can be available from market priority table 116, from a remote server (e.g., a server implementing online service account manager 104 or a service 106), or alternatively other sources.

The configuration settings, whether client-side market configuration settings or server-side market configuration settings, refer to configuration settings for the application 112. These configuration settings include, for example, settings for the UI to be presented by application 112, settings for what services 106 are available to application 112, settings for what functionality of each of services 106 is available to application 112, and so forth.

In one or more embodiments different pieces of market information are used in detecting the current market and determining the market configuration settings. Each of these pieces of market information describes a particular market or a location within that market. A market generally refers to a region in which the locations in the region are to be treated the same in terms of configuration settings for application 112. For example, a region could be a country, a group of countries, a state or province, and so forth. The specific regions used by the selecting between client-side and server-side market detection discussed herein can vary by implementation based on the desires of the designer of system 100. In situations where a piece of market information identifies a location, a market that includes that location can be identified in a variety of different manners, such as by using a table or other mapping of locations to markets.

In one or more embodiments, one or more of the following three pieces of market information is used in detecting the current market and determining the market configuration settings: an operating system market, a geographic location, and an account provisioning market. The operating system market refers to a market for computing device 102 set by operating system 114. This operating system market can be set when operating system 114 is installed on computing device 102, and/or can be set at other times. In one or more embodiments, a user of computing device 102 can optionally change the operating system market. This allows the user to select the particular market for which he or she desires computing device 102 to be set.

The geographic location refers to the geographic location of computing device 102. The geographic location of computing device 102 can be determined in different manners. In one or more embodiments, the geographic location of computing device 102 is determined by a remote server (e.g., a server implementing online service account manager 104 or a service 106) detecting a network address assigned to computing device 102. This network address can be, for example, an IP (Internet Protocol) address or other network address assigned to computing device 102. Alternatively, the geographic location of computing device 102 can be determined in other manners, such as based on GPS (Global Positioning System) coordinates obtained by operating system 114 or another component or module of (or coupled to) computing device 102, based on a cellular node or other wireless communications access point accessed by computing device 102, and so forth.

The account provisioning market refers to the market in which the user of computing device signed up for or registered for his or her online service account. This account provisioning market can be identified by the user during the signup or registration process, or alternatively can be determined automatically by computing device 102 and/or online service account manager 104. For example, one or more of the techniques discussed above for detecting the geographic location of computing device 102 can be used to detect the geographic location of computing device 102 at the time the user signed up for or registered for his or her online service account. These detected geographic locations can be used to identify the account provisioning market for computing device 102. Other techniques to identify the account provisioning market for computing device 102 can also be used, such as an identification made by a service representative (e.g., in situations where the user signs up for or registers for his account offline, such as in a store), a location associated with an identification (e.g., driver's license) or credit card provided by the user, and so forth.

Market priority table 116 is a table storing data that allows a determination to be made as to the configuration settings for application 112. This determination includes a determination of whether a client-side detected market or a server-side detected market has priority. Although discussed herein primarily as a table, it is to be appreciated that market priority table 116 can be implemented as multiple tables and/or using other data structures other than a table or tables.

Generally the configuration settings for application 112 are determined based on market priority table 116 as well as the operating system market, the geographic location, and the account provisioning market pieces of market information discussed above. For each market and each service, the configuration settings for application 112 for that service are determined. The determination of configuration settings for application 112 can be viewed as a two-part process. In the first part of the process, a determination is made as to whether a client-side detected market has priority or a server-side detected market has priority. In the second part of the process, a determination is made as to the particular configuration settings for application 112 given the results of the determination in the first part.

For each of multiple markets, market priority table 116 includes a record indicating whether a server-side detected market or a client-side detected market has priority for each service 106. Application 112 determines the current market for each service 106 based on both market priority table 116 and the pieces of market information that are available at the time application 112 makes the determination. As new pieces of market information become available, a new determination can be made.

In one or more embodiments, market priority table 116 includes information identifying the relative priority of the pieces of market information and how they are to be combined to determine which of the client-side market detection or server-side market detection has priority. For example, table 116 may include information indicating that the client-side market detection has priority if the user is not logged into his or her online service account, but that server-side market detection has priority if the user is logged into his or her online service account. By way of another example, table 116 may include information indicating that the client-side market detection has priority if the geographic location piece of market information is not currently available to application 112, but that server-side market detection has priority if the geographic location piece of market information is currently available to application 112. Alternatively, application 112 or another component or module can be configured with a set of rules or other knowledge indicating how to determine which of the client-side market detection or server-side market detection has priority.

After the determination is made as to whether the server-side detected market has priority or the client-side detected market has priority, market priority table 116 is used to determine the particular configuration settings for application 112 given the current market. The current market is the server-side detected market if the server-side detected market has priority, and is the client-side detected market if the client-side detected market has priority. For each of multiple markets, market priority table 116 identifies the configuration settings for application 112 based on the three pieces of market information discussed above. Different configuration settings can be stored in table 116 as the client-side market configuration settings for a particular market than are stored as the server-side market configuration settings. Alternatively, the configuration settings can be obtained from other sources, such as services 106.

In one or more embodiments, application 112 determines the configuration settings for application 112. Alternatively, the configuration settings for application 112 can be determined by a different module or component of computing device 102, such as operating system 114 or another module or component. In other alternatives, the configuration settings for application 112 can be determined at least in part by a remote server or service, such as a service 106. For example, if server-side market configuration settings have priority over client-side market configuration settings, then a service 106 can determine the particular configuration settings for that service 106 and communicate those configuration settings to application 112.

Additionally, in one or more embodiments a service 106 is able to override the configuration settings determined by application 112. An indication of when service 106 is able to override the configuration settings can be maintained in market priority table 116, or alternatively in another table or record of computing device 102 or another device. The indication identifies which particular services can override which particular configuration settings for which particular markets. In such embodiments, a service 106 can send a communication to application 112 requesting that a particular configuration setting for that service 106 be overridden. For example, the service 106 could send an indication to application 112 that a different UI is to be presented by application 112, or different functionality of the service 106 is to be made available to the user. If market priority table 116 indicates that the service 106 can override the configuration settings, then application 112 will change the configuration settings to new configuration settings as requested by service 106; otherwise application 112 will not make the change and will keep the current configuration setting.

The determination of the configuration settings for application 112 can be made at a variety of different times. In one or more embodiments, the configuration settings for application 112 are determined when application 112 is installed, each time application 112 is run, and when the user logs into his or her online service account. The configuration settings for application 112 can alternatively be determined at different times, such as at regular or irregular intervals, in response to a request from a remote server (e.g., a server implementing online service account manager 104 or a service 106), in response to a request from another component or module of computing device 102 (e.g., operating system 114 or another component or module), in response to a user request, and so forth.

Market priority table 116 can change over time. In one or more embodiments, computing device 102 obtains a feed via network 108 of new data for market priority table 116. The feed of data can be an update of changes to the data since the last time data for table 116 was communicated to device 102, or alternatively can be a retransmission of all the data in table 116. This feed of data can be implemented in a variety of manners, such as a location of a server device that is accessed by a component or module of computing device 102 to obtain the data, a server device broadcasting the data that is received by a component or module of computing device 102, and so forth. An initial market priority table 116 can be obtained by computing device 102 when application 112 is installed on computing device 102 as part of the installation process. Alternatively, the initial market priority table 116 can be received as part of the feed via network 108.

The ability to change market priority table 116 over time allows changes in configuration settings to be easily made for different markets. Various changes can be made, such as permitting or denying access to services 106 for different markets, changing the functionality provided by particular services 106 for different markets, changing a UI that is presented for particular services 106 for different markets, and so forth.

Additionally, in one or more embodiments an indication of when table 116 was most recently updated is maintained. This indication can be maintained in table 116, by application 112, or alternatively by some other component or module of computing device 102. In determining configuration settings for application 112, a check is made as to whether priority table 116 has been updated within a threshold amount of time. This threshold amount of time can vary, such as two hours, one day, one week, and so forth. If market priority table 116 has not been updated within the threshold amount of time, then application 112 takes a responsive action to restrict access to services 106. This responsive action can be implemented in different manners, such as preventing all access to services 106, presenting a UI indicating that services 106 cannot be accessed until table 116 is updated, disabling application 112 until table 116 is updated, and so forth. Application 112 is thus able to impose a restriction on its configuration settings so that changes to the configuration settings via updates to table 116 are not circumvented.

Furthermore, additional security constraints can be imposed to prevent a user of computing device 102 from circumventing these restrictions imposed on the configuration settings. These additional security constraints can be imposed in a variety of different manners, and are designed to prevent an outdated market priority table 116 from being used by application 112. For example, a service 106 can request some information from application 112, such as market priority table 116 (or a hash thereof) to verify that application 112 has a most recent version of (or at least an acceptable version of) table 116.

Computing device 102 also includes market resource file 118. Market resource file 118 contains entry points for different services 106 for different markets. The manner in which these entry points are identified can vary based on the manner in which services 106 are implemented. In one or more embodiments, the entry points are Uniform Resource Locators (URLs) of services 106. In other embodiments the entry points can be identified in different manners, such as network addresses (e.g., IP or other addresses), other service identifiers, and so forth.

The particular entry points used by application 112 for services 106 are determined based on the current market of computing device 102. This current market of computing device 102 is the current market that was determined as discussed above for the configuration settings for application 112. When the current market of computing device 102 changes, then market resource file 118 is accessed to determine the appropriate entry points for services 106 for the new current market.

Market resource file 118 can change over time. In one or more embodiments, computing device 102 obtains a feed via network 108 of data for market resource file 118. The feed of data can be an update of changes to the data since the last time data for file 118 was communicated to device 102, or alternatively can be a retransmission of all the data in file 118. This feed of data can be implemented in a variety of manners, such as a location of a server device that is accessed by a component or module of computing device 102 to obtain the data, a server device broadcasting the data that is received by a component or module of computing device 102, and so forth. The feed via which market resource file 118 is received can be the same feed used to obtain updates to market priority table 116, or alternatively a different feed. An initial market resource file 118 can be obtained by computing device 102 when application 112 is installed on computing device 102 as part of the installation process. Alternatively, the initial market resource file 118 can be received as part of the feed via network 108. If situations arise where an attempt to obtain changes to or a newer version of market resource file 118 fails, then the version of market resource file 118 already on computing device 102 is used. Subsequent attempts can then be made to obtain the changes to, or newer version of, market resource file 118.

The selecting between client-side and server-side market detection discussed herein allows for different services, functionality, and user interfaces to be made available to users of computing devices 102 in different markets. Users are able to move their computing devices 102 to different markets and have them operate appropriately based on the current market and the various pieces of market information.

By way of example, assume that a user in a first market installs an operating system on his or her computing device identifying the first market, registers for his or her online service account in the first market, and desires to access services 106 while the computing device is physically located in the first market. The current market would be identified as the first market, and the market priority table 116 would indicate as configuration settings that the user is to be presented with UIs in his or her language and is allowed to access services that are available to users in the first market.

By way of another example, assume this same user travels to a second market in which a different language is spoken and in which restrictions on accessing a particular service are placed on citizens of that second market. The current market could be identified as the first market because the first market is where the user registered for his or her online service account. The market priority table 116 would indicate as configuration settings that the user is to be presented with UIs in the language of the first market. The market priority table 116 would further indicate that the user is allowed to access services that are available to users in the first market, even though access to such services by citizens of the second market is prohibited.

By way of yet another example, assume that a second user in the second market installs an operating system on his or her computing device identifying the second market, registers for his or her online service account in the second market, and desires to access services 106 that citizens of the second market are prohibited from accessing. The current market could be identified as the second market because the second market is where the user registered for his or her online service account. When this second user is using his or her computing device in the second market, market priority table 116 would indicate that the user is not permitted to access those particular services 106. Furthermore, if the user travels to the first market, market priority table 116 would still indicate that the user is not permitted to access those particular services 106 because the user registered for his or her online service account in the second market. Thus, the second user is prohibited from accessing those particular services while in the first market even though citizens of the first market are permitted to access those particular services 106.

Figure 2:
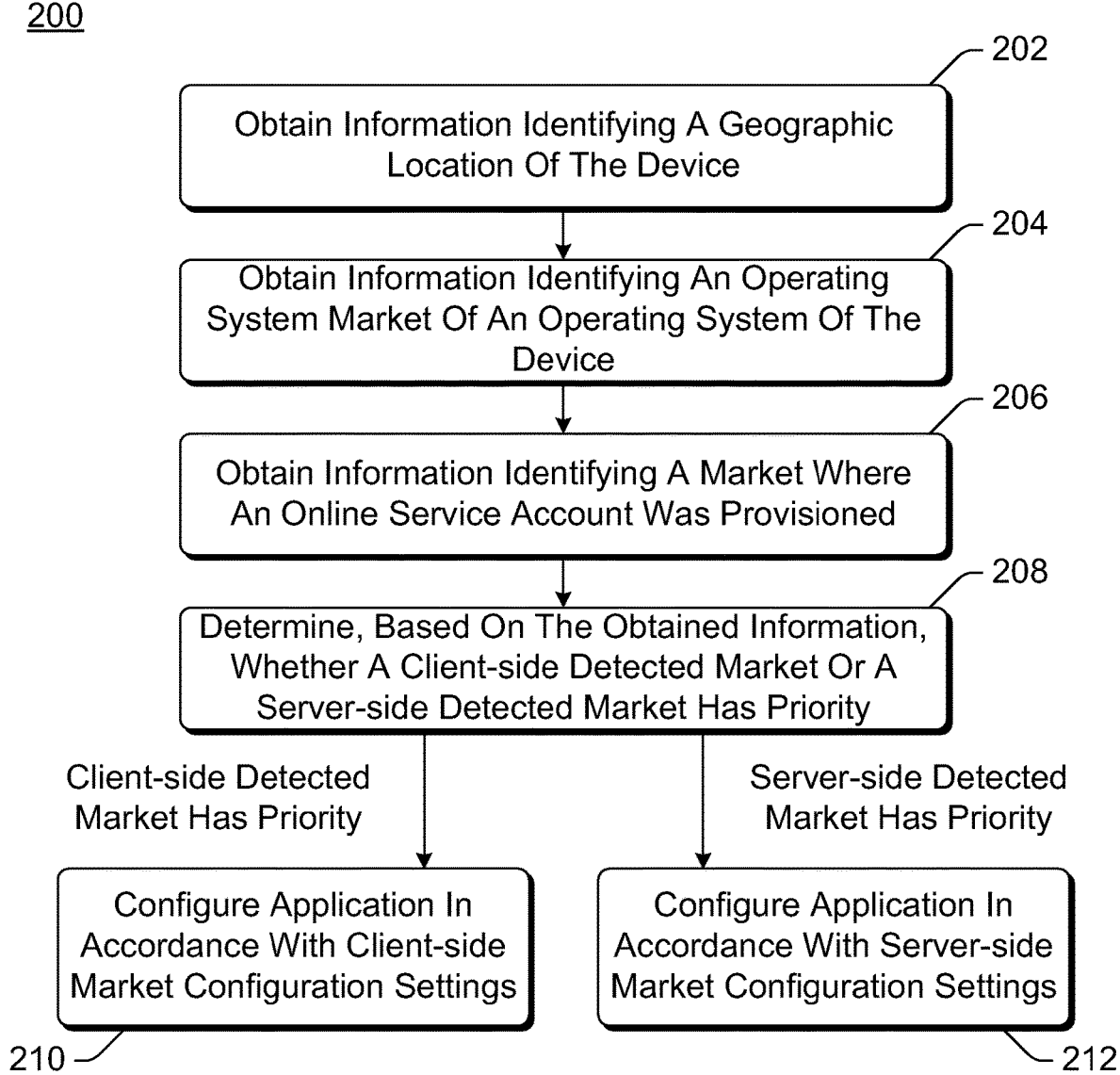
FIG. 2 is a flowchart illustrating an example process for selecting between client-side and server-side market detection in accordance with one or more embodiments.

FIG. 2 is a flowchart illustrating an example process 200 for selecting between client-side and server-side market detection in accordance with one or more embodiments. Process 200 can be carried out by various components or modules, such as application 112 and/or service 106 of FIG. 1, and can be implemented in software, firmware, hardware, or combinations thereof. Process 200 is an example process for selecting between client-side and server-side market detection; additional discussions of selecting between client-side and server-side market detection are included herein with reference to different figures.

In process 200, information identifying a geographic location of a device is obtained (act 202). Information identifying an operating system market of an operating system of the device is also obtained (act 204). Furthermore, information identifying a market where an online service account of a user of the device was provisioned is obtained (act 206). This various information obtained in acts 202, 204, and 206 are the pieces of market information discussed above.

Based on this information obtained in acts 202, 204, and 206, a determination is made as to whether a client-side detected market or a server-side detected market has priority (act 208). If the client-side detected market has priority, then an application of the device is configured in accordance with client-side market configuration settings (act 210). As discussed above, these configuration settings can include different presentations for UIs, different services to be made available, different functionality of services to be made available, and so forth.

However, if the server-side detected market has priority, then an application of the device is configured in accordance with server-side market configuration settings (act 212). As discussed above, these configuration settings can include different presentations for UIs, different services to be made available, different functionality of services to be made available, and so forth.

Figure 3:
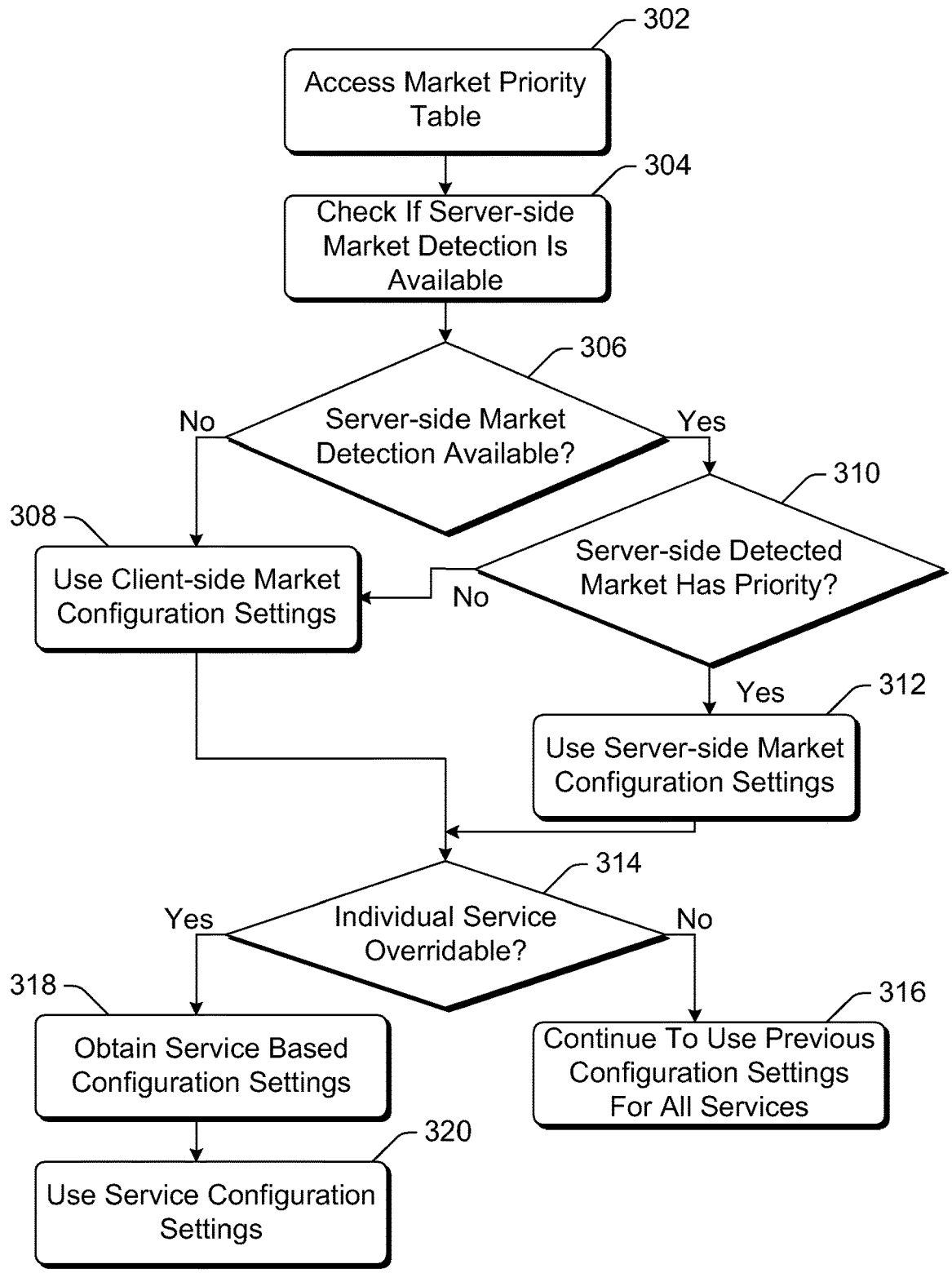
FIG. 3 is a flowchart illustrating another example process for selecting between client-side and server-side market detection in accordance with one or more embodiments.

FIG. 3 is a flowchart illustrating an example process 300 for selecting between client-side and server-side market detection in accordance with one or more embodiments. Process 300 can be carried out by various components or modules, such as application 112 and/or service 106 of FIG. 1, and can be implemented in software, firmware, hardware, or combinations thereof. Process 300 is an example process for selecting between client-side and server-side market detection; additional discussions of selecting between client-side and server-side market detection are included herein with reference to different figures.

Process 300 selects between client-side market detection and server-side market detection, identifying configuration settings for an application in situations where the user may not yet be logged in to his or her online service account. Process 300 thus allows initial configuration settings for an application to be set. These configuration settings can subsequently be changed when the user logs into his or her online service account, as discussed in more detail below.

In process 300, the market priority table is accessed (act 302). Additionally, a check is made as to whether server-side market detection is available (act 304). In one or more embodiments, server-side market detection is available only in situations where the user is logged in to his or her online service account. In other embodiments, server-side market detection is available in other situations, such as where the user previously logged into his or her online service account and/or accessed a remote service and had server-side market configuration settings stored on his or her device.

Process 300 then proceeds based on whether server-side market detection is available (act 306). If server-side market detection is not available, then client-side market configuration settings from the market priority table are used to configure the application (act 308). However, if server-side market detection is available, then a determination is made as to whether the server-side detected market has priority (act 310). As discussed above, this determination is based on the market priority table.

If the server-side detected market does not have priority, then client-side market configuration settings have priority and are used to configure the application (act 308). If the server-side detected market does have priority, then server-side market configuration settings are used to configure the application (act 312).

Regardless of whether the server-side or client-side market configuration settings are used to configure the application, a check is made as to whether an individual service can override the configuration settings for the current market (act 314). This check can be made, for example, based on data stored in the market priority table as discussed above. If an individual service cannot override the configuration settings, then the configuration settings used in act 308 or 312 continue to be used for all services (act 316).

However, if an individual service can override the configuration settings, then configuration settings for the service are obtained (act 318). These configuration settings for the service can be obtained from different sources, such as the service itself, the market priority table, and so forth. These obtained service configuration settings are used to configure the application for that service (act 320).

Figure 4:
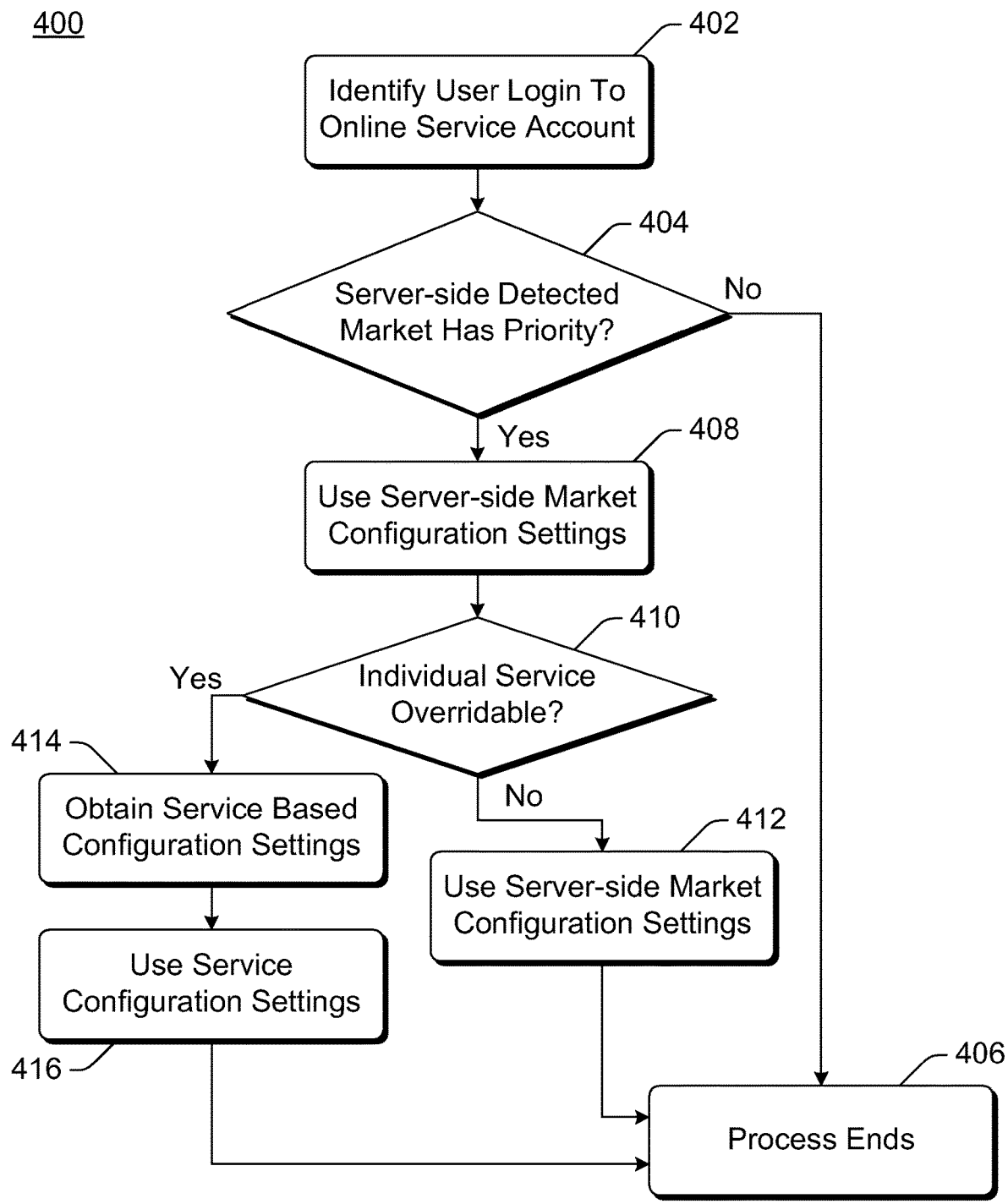
FIG. 4 is a flowchart illustrating another example process for selecting between client-side and server-side market detection in accordance with one or more embodiments.

FIG. 4 is a flowchart illustrating an example process 400 for selecting between client-side and server-side market detection in accordance with one or more embodiments. Process 400 can be carried out by various components or modules, such as application 112 and/or service 106 of FIG. 1, and can be implemented in software, firmware, hardware, or combinations thereof. Process 400 is an example process for selecting between client-side and server-side market detection; additional discussions of selecting between client-side and server-side market detection are included herein with reference to different figures.

Process 400 identifies configuration settings for an application after the user has logged in to his or her online service account. Process 400 can be performed, for example, after process 300 of FIG. 3 is performed, optionally changing the configuration settings used in process 300 as discussed in more detail below.

In process 400, the user having logged in to his or her service account is identified (act 402). This login can be identified in different manners, such as the user logging in using the component or module implementing process 400, receiving an indication of the user having logged in from the online service account, and so forth.

A check is then made as to whether the server-side detected market has priority (act 404). If the server-side detected market does not have priority, then process 400 ends (act 406) with any previous configuration settings (e.g., configuration settings resulting from process 300 of FIG. 3) continuing to be used. However, if the server-side detected market does have priority, then the server-side market configuration settings are used to configure the application (act 408).

A check is made as to whether an individual service can override the configuration settings for the current market (act 410). This check can be made, for example, based on data stored in the market priority table as discussed above. If an individual service cannot override the configuration settings, then the server-side market configuration settings used in act 408 continue to be used for all services (act 412), and process 400 ends (act 406).

However, if an individual service can override the configuration settings, then configuration settings for the service are obtained (act 414). These configuration settings for the service can be obtained from different sources, such as the service itself, the market priority table, and so forth. These obtained service configuration settings are used to configure the application for that service (act 416), and process 400 ends (act 406).

Figure 5:
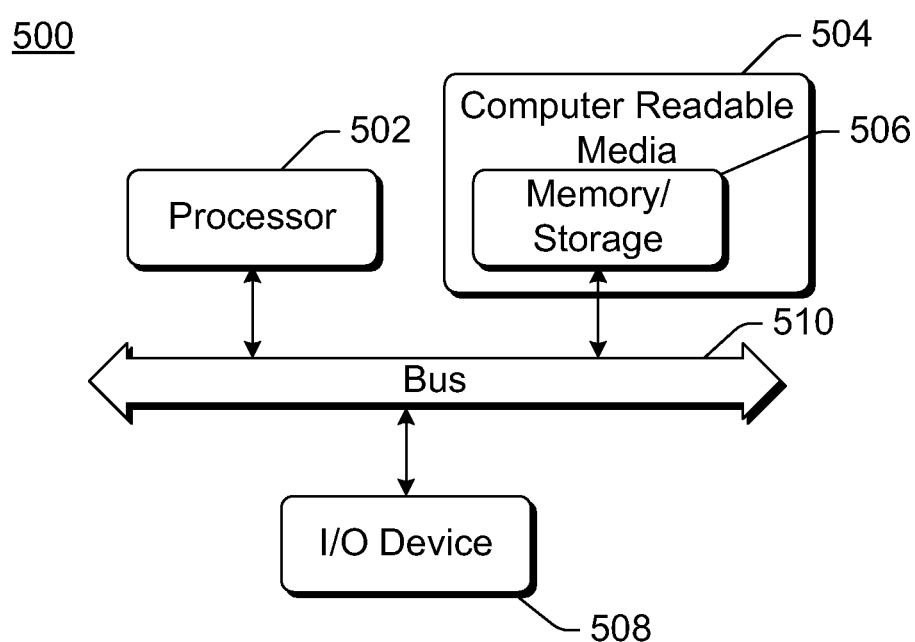
FIG. 5 illustrates an example computing device that can be configured to implement the selecting between client-side and server-side market detection in accordance with one or more embodiments.

FIG. 5 illustrates an example computing device 500 that can be configured to implement the selecting between client-side and server-side market detection in accordance with one or more embodiments. Computing device 500 can be, for example, computing device 102 of FIG. 1, or can implement manager 104 or one or more service 106 of FIG. 1.

Computing device 500 includes one or more processors or processing units 502, one or more computer readable media 504 which can include one or more memory and/or storage components 506, one or more input/output (IO) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "functionality," and "component" as used herein generally represent software, firmware, hardware, or combinations thereof. In the case of a software implementation, the module, functionality, or component represents program code that performs specified tasks when executed on a processor (e.g., CPU or CPUs). The program code can be stored in one or more computer readable memory devices, further description of which may be found with reference to FIG. 5. The features of the selecting between client-side and server-side market detection techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling services provided by an application on a mobile computing device, the method comprising:
   detecting, by the mobile computing device, based at least on a communication received from a remote device, a current market within which the mobile computing device is communicating;
   based at least on the detecting, accessing, by the mobile computing device, a market priority table that is stored at the mobile computing device, the market priority table storing client-side configuration information that is based on the current market within which the mobile computing device is communicating and server-side configuration information that is based on markets other than the current market within which the mobile computing device is communicating;
   prioritizing, by the mobile computing device based at least on information of the market priority table and the current market within which the mobile computing device is communicating, a client-side configuration that is based on the current market within which the mobile computing device is communicating over a server-side configuration;
   based at least on the detected current market and the prioritized client-side configuration, selecting, by the mobile computing device from the accessed market priority table, a client-side configuration that is based on the current market within which the mobile computing device is communicating; and
   based at least on the selected client-side configuration that is based on the current market within which the mobile computing device is communicating, configuring, by the mobile computing device, an application running on the mobile computing device according to the client-side configuration that is based on the current market within which the mobile computing device is communicating,
   wherein the client-side configuration imposes an increased amount of content restrictions as compared to the server-side configuration.

2. A method as recited in claim 1, wherein the server-side configuration comprises one or more user interface settings that are different from the client-side configuration.

3. A method as recited in claim 1, wherein the server-side configuration comprises one or more additional remote services as compared to the client-side configuration.

4. A method as recited in claim 1, wherein the server-side configuration comprises one or more functionalities that are different from the client-side configuration.

5. A method as recited in claim 1, wherein the server-side configuration comprises one or more additional functionalities as compared to the client-side configuration.

6. A method as recited in claim 1, further comprising:
   obtaining an indication that the configured application running on the mobile computing device according to the client-side configuration of the current market is subject to an override;
   obtaining, from a remote service, an override configuration of the configured application running on the mobile computing device; and
   based on the obtained override configuration, overriding the client-side configuration of the configured application running on the mobile computing device.

7. The method of claim 1 further comprising:
   determining, by the mobile computing device, that the market priority table include out-of-date information; and
   updating the market priority table that is stored at the mobile computing device.

8. A mobile computing device comprising:
   one or more processors;
   a computer storage medium having stored thereon multiple instructions that, responsive to execution by the one or more processors, cause the one or more processors to perform acts comprising:

detecting, by the mobile computing device, based at least on a communication received from a remote device, a current market within which the mobile computing device is communicating;

based at least on the detecting, accessing, by the mobile computing device, a market priority table that is stored at the mobile computing device, the market priority table storing client-side configuration information that is based on the current market within which the mobile computing device is communicating and server-side configuration information that is based on markets other than the current market within which the mobile computing device is communicating;

prioritizing, by the mobile computing device based at least on information of the market priority table and the current market within which the mobile computing device is communicating, a client-side configuration that is based on the current market within which the mobile computing device is communicating over a server-side configuration;

based at least on the detected current market and the prioritized client-side configuration, selecting, by the mobile computing device from the accessed market priority table, a client-side configuration that is based on the current market within which the mobile computing device is communicating; and based at least on the selected client-side configuration that is based on the current market within which the mobile computing device is communicating, configuring, by the mobile computing device, an application running on the mobile computing device according to the client-side configuration that is based on the current market within which the mobile computing device is communicating, wherein the client-side configuration imposes an increased amount of content restrictions as compared to the server-side configuration.

9. The mobile computing device as recited in claim 8, wherein the server-side configuration comprises one or more user interface settings that are different from the client-side configuration.

10. The mobile computing device as recited in claim 8, wherein the server-side configuration comprises one or more additional remote services as compared to the client-side configuration.

11. The mobile computing device as recited in claim 8, wherein the server-side configuration comprises one or more functionalities that are different from the client-side configuration.

12. The mobile computing device as recited in claim 8, wherein the server-side configuration comprises one or more additional functionalities as compared to the client-side configuration.

13. The mobile computing device as recited in claim 8 wherein the multiple instructions cause the one or more processors to perform further acts comprising:
obtaining an indication that the configured application running on the mobile computing device according to the client-side configuration of the current market is subject to an override;
obtaining, from a remote service, an override configuration of the configured application running on the mobile computing device; and
based on the obtained override configuration, overriding the client-side configuration of the configured application running on the mobile computing device.

14. The mobile computing device as recited in claim 8 wherein the multiple instructions cause the one or more processors to perform further acts comprising:
determining, by the mobile computing device, that the market priority table include out-of-date information; and
updating the market priority table that is stored at the mobile computing device.

15. A mobile computing device comprising:
one or more processors;
one or more transceivers;
one or more market priority table, stored in memory, that comprises client-side configuration information and server-side configuration information of a plurality of markets; and
one or more modules configured to:
detect, by the mobile computing device, based at least on a communication received from a remote device, a current market within which the mobile computing device is communicating;
based at least on the detecting, access, by the mobile computing device, a market priority table that is stored at the mobile computing device, the market priority table storing client-side configuration information that is based on the current market within which the mobile computing device is communicating and server-side configuration information that is based on markets other than the current market within which the mobile computing device is communicating;
prioritize, by the mobile computing device based at least on information of the market priority table and the current market within which the mobile computing device is communicating, a client-side configuration that is based on the current market within which the mobile computing device is communicating over a server-side configuration;
based at least on the detected current market and the prioritized client-side configuration, select, by the mobile computing device from the accessed market priority table, a client-side configuration that is based on the current market within which the mobile computing device is communicating; and
based at least on the selected client-side configuration that is based on the current market within which the mobile computing device is communicating, configure, by the mobile computing device, an application running on the mobile computing device according to the client-side configuration that is based on the current market within which the mobile computing device is communicating,
wherein the client-side configuration imposes an increased amount of content restrictions as compared to the server-side configuration.

16. The mobile computing device as recited in claim 15, wherein the server-side configuration comprises one or more user interface settings that are different from the client-side configuration.

17. The mobile computing device as recited in claim 15, wherein the server-side configuration comprises one or more functionalities that are different from the client-side configuration.

18. The mobile computing device as recited in claim 15, wherein the server-side configuration comprises one or more additional remote services as compared to the client-side configuration.

19. The mobile computing device as recited in claim 15, wherein the one or more modules are further configured to:
- obtain an indication that the configured application running on the mobile computing device according to the client-side configuration of the current market is subject to an override;
- obtain, from a remote service, an override configuration of the configured application running on the mobile computing device according to the client-side configuration of the current market; and
- based on the obtained override configuration, overriding the client-side configuration of the configured application running on the mobile computing device.

20. The mobile computing device as recited in claim 15, wherein the one or more modules are further configured to:
- determine that the market priority table include out-of-date information; and
- update the market priority table that is stored at the mobile computing device.

* * * * *